United States Patent
Towles

(10) Patent No.: US 12,068,971 B2
(45) Date of Patent: Aug. 20, 2024

(54) ROBUST AGE-SATURATION MECHANISM FOR AGE-BASED ARBITRATION IN PACKET NETWORKS

(71) Applicant: Google LLC, Mountain View, CA (US)

(72) Inventor: Brian Towles, Chapel Hill, NC (US)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 17/704,677

(22) Filed: Mar. 25, 2022

(65) Prior Publication Data

US 2023/0275844 A1   Aug. 31, 2023

Related U.S. Application Data

(60) Provisional application No. 63/314,067, filed on Feb. 25, 2022.

(51) Int. Cl.
  *H04L 47/62*  (2022.01)
  *H04L 47/56*  (2022.01)

(52) U.S. Cl.
  CPC ............ *H04L 47/62* (2013.01); *H04L 47/564* (2013.01)

(58) Field of Classification Search
  CPC ...... H04L 47/564; H04L 47/62; H04L 47/566
  See application file for complete search history.

(56) References Cited

U.S. PATENT DOCUMENTS

| | | | | |
|---|---|---|---|---|
| 5,392,279 A * | 2/1995 | Taniguchi | ........... | H04L 12/5601 370/380 |
| 5,412,799 A * | 5/1995 | Papadopoulos | ......... | G06F 11/34 703/22 |
| 6,674,720 B1 * | 1/2004 | Passint | .................... | H04L 47/10 370/235 |
| 6,907,041 B1 * | 6/2005 | Turner | .................. | H04L 49/105 370/414 |
| 7,768,923 B2 * | 8/2010 | Kumar | .................... | H04L 47/32 370/235 |
| 7,817,549 B1 * | 10/2010 | Kasralikar | ............ | H04L 43/026 370/235 |
| 9,203,725 B2 * | 12/2015 | Ronchetti | ............. | H04J 3/0697 |
| 10,439,952 B1 * | 10/2019 | Mitulal | ................... | H04L 47/30 |

(Continued)

OTHER PUBLICATIONS

M. Galles, "Spider: a high-speed network interconnect," in IEEE Micro, vol. 17, No. 1, pp. 34-39, Jan.-Feb. 1997, doi: 10.1109/40.566196.

(Continued)

*Primary Examiner* — Stephen J Clawson
(74) *Attorney, Agent, or Firm* — Lerner David LLP

(57) ABSTRACT

Systems and method for routing data packets in an interconnection network. The data packets transmitted across the interconnection network each include age data. Routers positioned throughout the interconnection network may control the flow of the data packets through the use of aging first-in, first-out (FIFO) queues and age-based arbiters. The age-based arbiters within the routers are configured to prioritize older data packets over newer data packets being pushed from the FIFO queues. Each data packet inserted into the FIFO queues may be updated such that the age data of the data packet is converted from an age to an injection time. When the data packet is read from the FIFO, the age data of the data packet is converted back to an age.

16 Claims, 7 Drawing Sheets

(56) References Cited

U.S. PATENT DOCUMENTS

| | | | | |
|---|---|---|---|---|
| 2003/0198231 A1* | 10/2003 | Kalkunte | ................. | H04L 45/54 |
| | | | | 370/395.31 |
| 2006/0182112 A1* | 8/2006 | Battle | .................... | H04L 49/352 |
| | | | | 370/392 |
| 2008/0192634 A1* | 8/2008 | Kumar | .................... | H04L 47/32 |
| | | | | 370/235 |
| 2010/0054268 A1* | 3/2010 | Divivier | ................ | H04L 49/901 |
| | | | | 370/412 |
| 2013/0028265 A1* | 1/2013 | Ronchetti | ........... | H04L 43/0858 |
| | | | | 370/400 |
| 2013/0286825 A1* | 10/2013 | Sherlock | ............... | H04L 47/562 |
| | | | | 370/230 |
| 2013/0329744 A1* | 12/2013 | Hachiya | .................. | H04L 45/66 |
| | | | | 370/401 |
| 2014/0068637 A1* | 3/2014 | Chen | ......................... | G06F 9/52 |
| | | | | 719/318 |
| 2015/0106537 A1* | 4/2015 | Bobrek | ................. | H04L 47/564 |
| | | | | 710/54 |
| 2016/0323166 A1* | 11/2016 | Pandey | ............... | H04L 43/0852 |
| 2017/0315932 A1* | 11/2017 | Moyer | .................. | G06F 12/123 |
| 2018/0288145 A1* | 10/2018 | Levy | .................... | G06F 11/1451 |
| 2021/0073171 A1* | 3/2021 | Master | ...................... | G06F 7/52 |
| 2022/0294727 A1* | 9/2022 | Azzam | ................. | H04L 43/106 |

OTHER PUBLICATIONS

D. Abts and D. Weisser, "Age-based packet arbitration in large-radix k-ary n-cubes," SC '07: Proceedings of the 2007 ACM/IEEE Conference on Supercomputing, 2007, pp. 1-11, doi: 10.1145/1362622.1362630.

International Search Report and Written Opinion for International Application No. PCT/US2022/048395 dated Feb. 8, 2023. 12 pages.

* cited by examiner

ROBUST AGE-SATURATION MECHANISM FOR AGE-BASED ARBITRATION IN PACKET NETWORKS

CROSS REFERENCE TO RELATED APPLICATION

This application claims the benefit of the filing date of U.S. Provisional Patent Application No. 63/314,067, filed on Feb. 25, 2022, the disclosure of which is hereby incorporated herein by reference.

BACKGROUND

Routers are typically positioned throughout an interconnection network, such as a distributed network of processors. Each router may include arbiters which control the transmission flow of data packets from the router. The arbiters may resolve conflicts, such as multiple packets vying for access to the same resource. Many arbiter designs are "locally fair," such that each source of packets gets equal access to a resource. However, when these locally fair arbiters are combined with any asymmetry in the overall network, "global unfairness," such as packet sources being underserved, may arise. Such global unfairness may ultimately lead to loss of network overall performance. The asymmetry that leads to global unfairness may come from the topology of the network, the topology of virtual networks within the network, or the traffic demands on the network.

BRIEF SUMMARY

This technology is directed to age-based arbitration systems and methods.

An aspect of the technology is directed to a method of routing data packets in an interconnection network. The method may include receiving a plurality of data packets at a node in the interconnection network, the node including a set of queues, wherein each received packet of the plurality of data packets includes an age; inputting a set of received data packets of the plurality of data packets to a first queue in the set of queues; and for each data packet in the set of received data packets: replacing the age of the data packet with an injection time corresponding to a local time of the first queue when the data packet was input into the first queue and the age of the data packet; determining an updated age based on the local time of the first queue when the data packet was transmitted from the first queue and the injection time of the data packet; and replacing the injection time of the data packet with the updated age.

Another aspect of the technology is directed to a system of routing data packets in an interconnection network. The system may include a router including at least one arbiter and a set of queues. The router may be configured to: receive a plurality of data packets, wherein each received packet of the plurality of data packets includes an age; input a set of received data packets of the plurality of data packets into to a first queue in the set of queues; and for each data packet in the set of received data packets: replace the age of the data packet with an injection time corresponding to a local time of the first queue when the data packet was input into the first queue and the age of the data packet; determine an updated age based on the local time of the first queue when the data packet was transmitted from the first queue and the injection time of the data packet; and replace the injection time of the data packet with the updated age.

In some instances, the updated age may be bounded to a maximum age value.

In some instances, each data packet may be transmitted from the first queue is sent to an arbiter.

In some instances, an arbiter receives a first data packet transmitted from the first queue and at least one other data packet transmitted from one or more of the other queues of the set of queues. In some examples, the arbiter: determines an oldest data packet from the first data packet and the at least one other data packet; and transmits the oldest data packet.

In some instances, the injection time is calculated by subtracting the age of the data packet from the local time of the first queue when the data packet was input into the first queue.

In some instances, the updated age is determined by subtracting the injection time of the data packet from the local time of the first queue when the data packet was transmitted from the first queue.

In some examples, the updated age is adjusted by an aging rate based on the value of the updated age relative to a maximum age.

In some examples, the aging rate is not adjusted when the updated age is less than half the maximum age.

In some examples, the aging rate is (i) 0.5 when the update age is between 50% and 75% of the maximum age; and (ii) $2^{-n}$, when the updated age is between $[1-2^{-n}$ and $1-2^{-n-1}]$.

DETAILED DESCRIPTION

Figure 1:
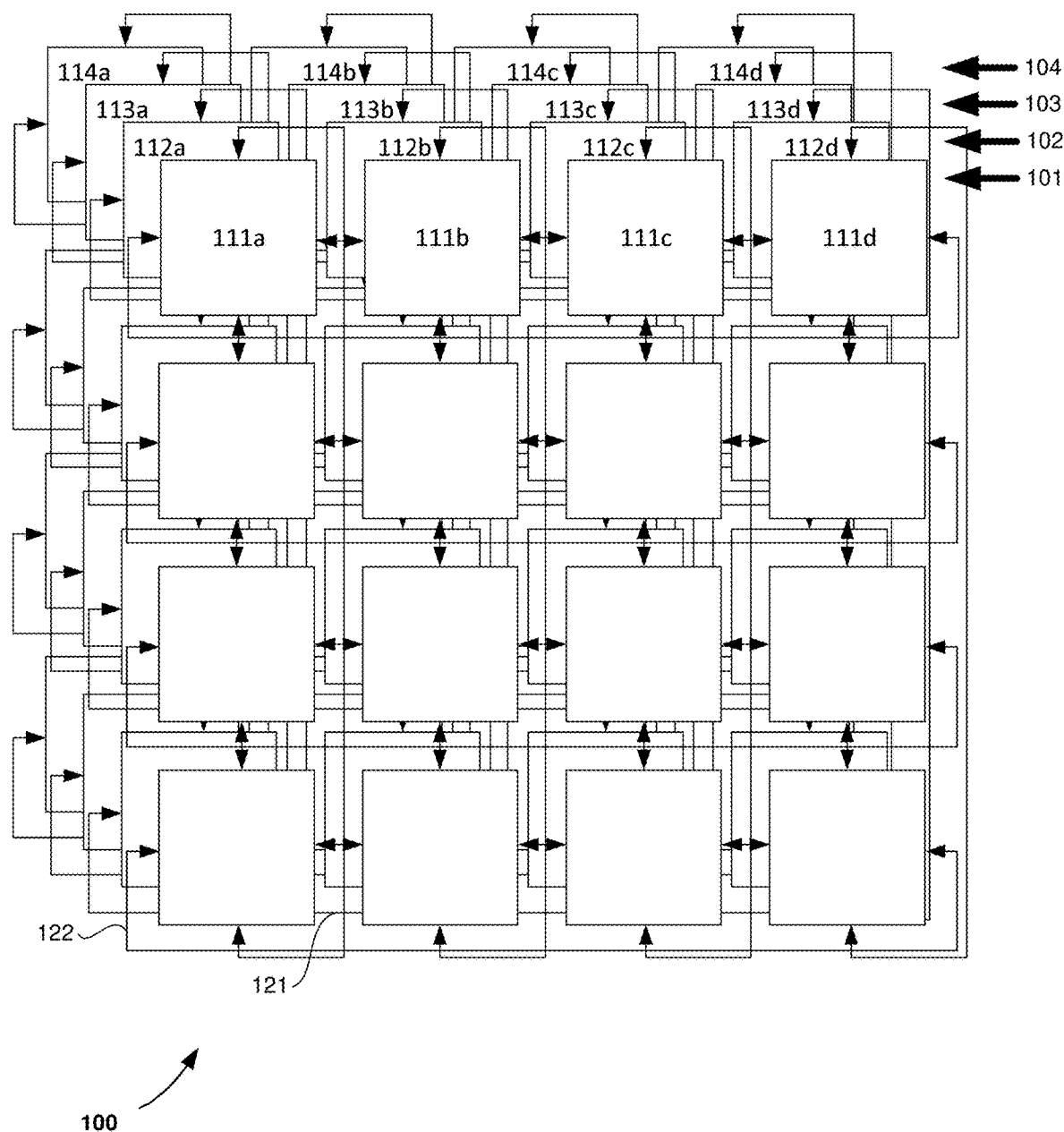
FIG. 1 illustrates an example interconnection network, in accordance with aspects of the disclosure.

The technology described herein is directed to routing data packets in an interconnection network. For example, components, such as processors, on an interconnection network may transmit and receive data packets to and from other components on the interconnection network. To improve the timeliness of the delivery of the data packets across the interconnection network, the data packets may include age data. Routers positioned throughout the interconnection network control the flow of the data packets through the use of aging first-in, first-out (FIFO) queues and age-based arbiters. The age-based arbiters within the routers are configured to prioritize older data packets over newer data packets being pushed from the FIFO queues.

As previously described, locally fair arbiters have shortcomings that result in global unfairness. These shortcomings of locally fair arbiters may be addressed by replacing them with age-based arbiters. Age-based arbiters may use a data packet's "age," representing the time the data was inserted into the network to prioritize older packets when resolving contentions when multiple data packets are vying for the same resource, such as the same transmission link, same input, etc.

A shortcoming of existing age-based arbiters is that updating each data packet's age requires careful fine tuning of parameters and/or global coordination between routers to avoid ages from becoming too large. And, because each data packet must carry its age through the network, the number of bits used to store this age are usually at a premium. If the age of a data packet overflows, by exceeding the maximum value represented by the bits used to store the age, then a very large age could become very small. For example, age data represented by 8-bits may store age values between 0 and 255. If the age of the data packet exceeds 255, the age of the data packet may reset back to 0, which can lead to unpredictable behavior, including further delays in delivering the data packet.

Further, many system resources may be required to directly monitor the age of all data packets in the interconnection network in order to prevent overflow. This is because packets are typically queued in large memory modules, such as random access memories (RAMs), and the stored data packets cannot be easily modified without significant time delays for reading and rewriting the stored data packets.

To address these issues with known age-based arbiters, aging FIFO queues may be used. Each aging FIFO may be comprised of RAM, such as SRAM, and may contain 10s, 100s, or more data packets. To avoid the issue of needing to read and rewrite data packets continuously to update their respective ages, each data packet inserted into an aging FIFO may have its age converted to an "injection time" relative to a local clock associated with the aging FIFO. The data packet may carry its injection time until it is transmitted from the aging FIFO. At this time the injection time may be converted back to an age, again using the local clock associated with the aging FIFO. By converting the age of the data packet to a time value when added to the aging FIFO, the age of the data packet can again be determined when, or before, it is transmitted from the aging FIFO, thereby avoiding the need to continuously update the age of the data packet as it traverses the FIFO.

FIG. 1 illustrates an example of an interconnection network 100 comprising a collection of nodes and interconnects. In this regard, FIG. 1 illustrates a 4×4×4 interconnection network 100 comprising four layers of nodes, identified by arrows 101, 102, 103, and 104. Each layer of nodes includes 16 nodes positioned in a 4×4 grid. For clarity only four nodes of each layer are identified. For instance, layer 101 includes nodes 111a-111d, layer 102 includes nodes 112a-112b, layer 103 includes nodes 113a-113d, and layer 104 includes nodes 114a-114d.

Nodes may include any computing resource capable of communicating with other computing resources. For instance, nodes may include computers, servers, mobile devices, processors, cores, routers, memory, cards (e.g., accelerator cards), FIFOs or other such queues, etc. In some instances, nodes may include a collection of computing resources, such as processors with routers and FIFOs, etc.

As further shown in FIG. 1, nodes of the interconnection network may be connected to other nodes via interconnects, such as interconnects 121 and 122. For clarity not all interconnects are shown or referenced in FIG. 1. Each interconnect may be any type of connection between nodes, such as wires, cables, traces, etc. Although each interconnect is shown as a single line, each interconnect may represent any number of connections between nodes.

Although FIG. 1 illustrates a 4×4×4 interconnection network 100, the interconnection network can include any number of nodes in any arrangement. For example, an interconnection network may include nodes in a one dimensional array, nodes in a two-dimensional array, independent nodes not included in an array, collection of nodes in any arrangement connected to other nodes, etc. Moreover, each node may be connected to some or all of the other nodes with any number of interconnects. Accordingly, FIG. 1 is merely an example layout of an interconnection network and the technology described should not be considered limited to the interconnection network shown in FIG. 1.

Figure 2:
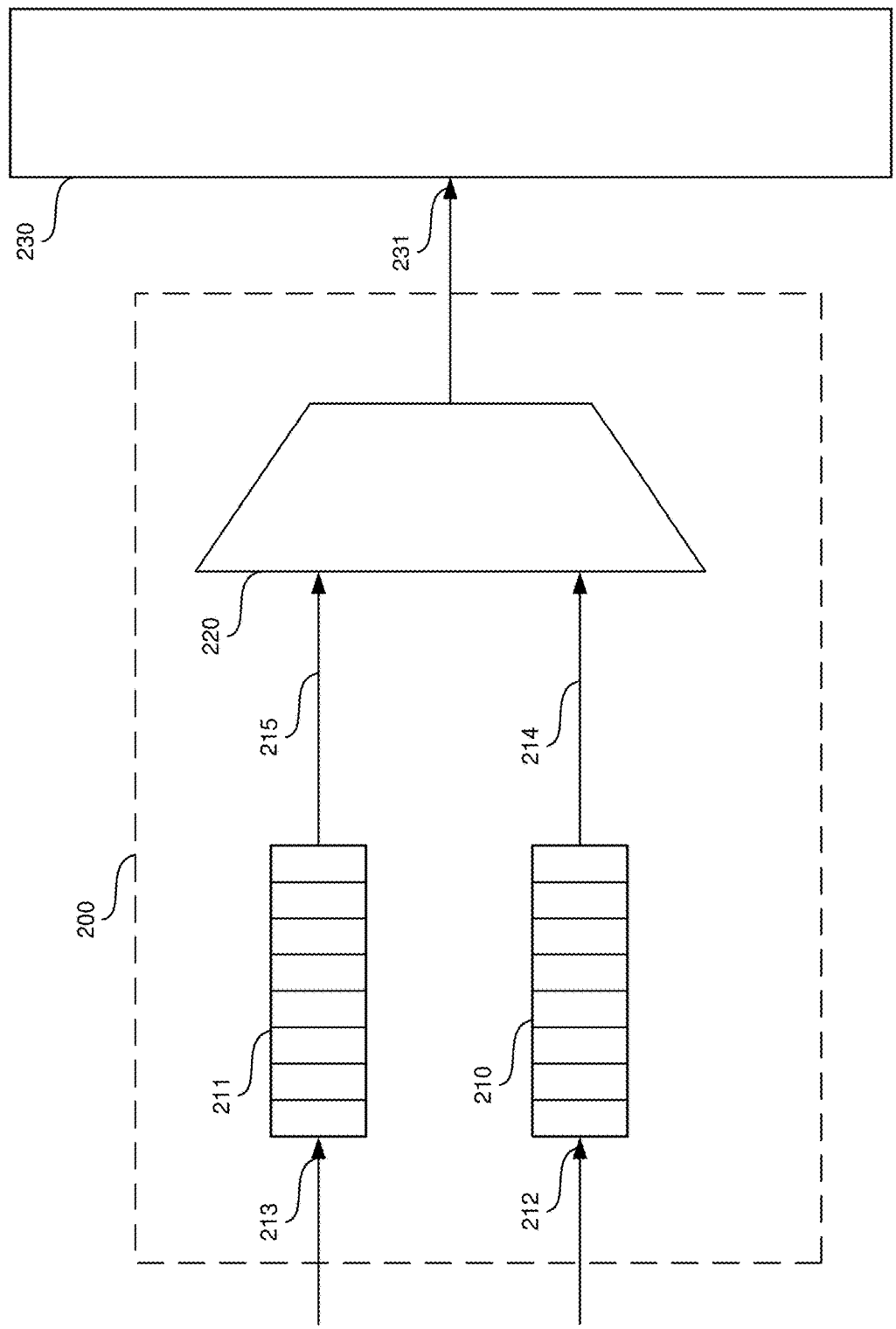
FIG. 2 illustrates an example of a router, in accordance with aspects of the disclosure.

FIG. 2 illustrates an example router 200 configured to control the flow of data packets throughout at least a portion of an interconnection network, such as interconnection network 100. Router 200 includes aging FIFOs 210, 211 which receive data packets directly from a node. The aging FIFOs 210, 211 may receive data packets from the same node or a different node. For instance, aging FIFO 210 may receive data packets from a first node as illustrated by arrow 212 and aging FIFO 211 may receive data packets from a second node as illustrated by arrow 213.

Each aging FIFO 210, 211 may transmit data packets to an arbiter 220, as illustrated by arrows 214 and 215, respectively. The arbiter 220 may determine the oldest data packets, based on the age of the data packet and transmit the data packet to another node 230, as illustrated by arrow 231.

Routers may be positioned along interconnections and/or within other resources. For instance, router 200 may be positioned within a processor, core, etc. Although router 200 is illustrated with only two aging FIFOs, routers may include any number of FIFOs and arbiters.

Figure 3:
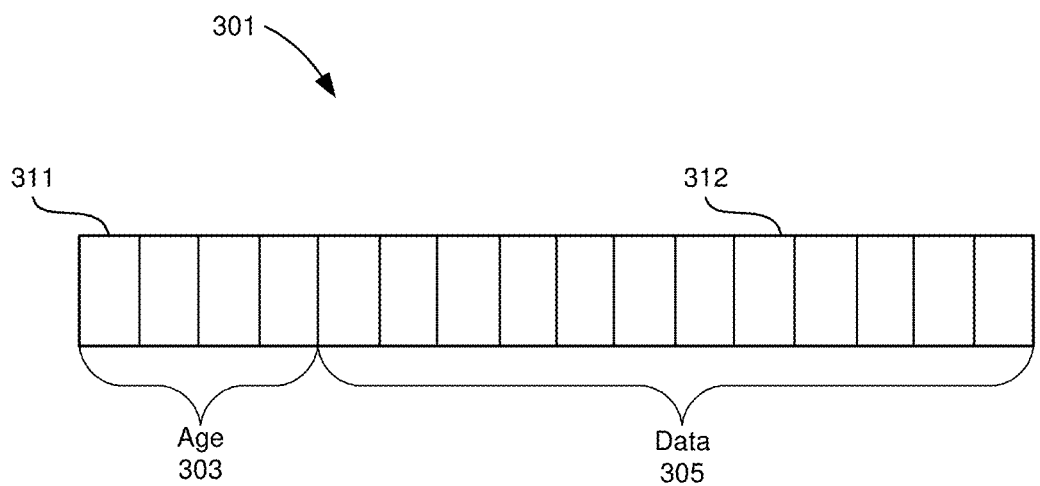
FIG. 3 illustrates an example of a data packet, in accordance with aspects of the disclosure.

FIG. 3 illustrates an example data packet 301 that can be transmitted on an interconnected network, such as interconnected network 100. The data packet includes 16-bits, including bits 311 and 312. For clarity only bits 311 and 312 are referenced.

As further illustrated in FIG. 3, data packet 301 includes age information 303 and data information 305. Age information 303 is represented by 4 bits, including bit 311 and data 305 is represented by 12 bits, including bit 312.

Data packet 301 is an example data packet, and other data packets having age data may be transmitted over an interconnection network. In this regard, data packets may be of any size, such as 8, 16, 32, 64, 128, etc., bits. Moreover, age information and data information may likewise be represented by any number of bits. For instance, age data may be represented by 8, 16, 32 bits, etc.

Additionally, the position of age data relative to other data within a data packet may be different than shown in FIG. 3. For instance, age data may be positioned after the other data, between the other data, and/or split throughout the entire data packet.

Figure 4A:
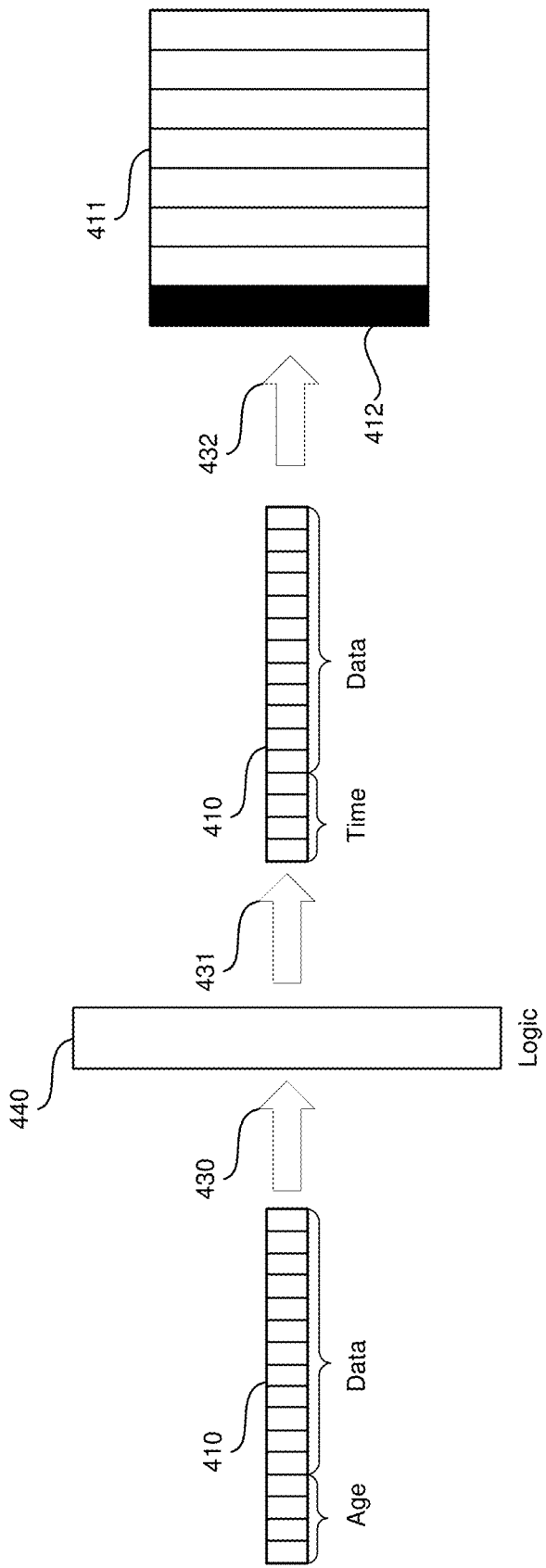
FIGS. 4A and 4B illustrate examples of updating age data within a data packet, in accordance with aspects of the disclosure.

As previously described, the age data of a data packet may be replaced with time data when it is inserted into an aging FIFO. For instance, and as illustrated in FIG. 4A, data packet 410 may be transmitted to aging FIFO 410. Before, or within the aging FIFO, the age data of the data packet 410 may be replaced with time data by logic 440, which may be discrete adders or other such discrete circuitry. In this regard, the data packet 410 may be received by logic 440, as illustrated by arrow 430. Logic may convert the age data to time data and output the data packet 410 with the time data instead of the age data, as illustrated by arrow 431. The data packet 410 may then be stored in the initial position 412 of aging FIFO 411.

After the data packet with the time data progresses to the last position 419 of the aging FIFO, the data packet 410 may be output by the aging FIFO 411 as illustrated by arrow 451 and input into additional logic 441, as illustrated by arrow 452. Logic 441 may convert the time back to age data representing the current age of the data packet 441 and send the data packet to its next destination, which may be an arbiter, as illustrated by arrow 453. In some instances the time data of the data packet 410 may be changed before it is output by the aging FIFO 411.

Figure 4B:
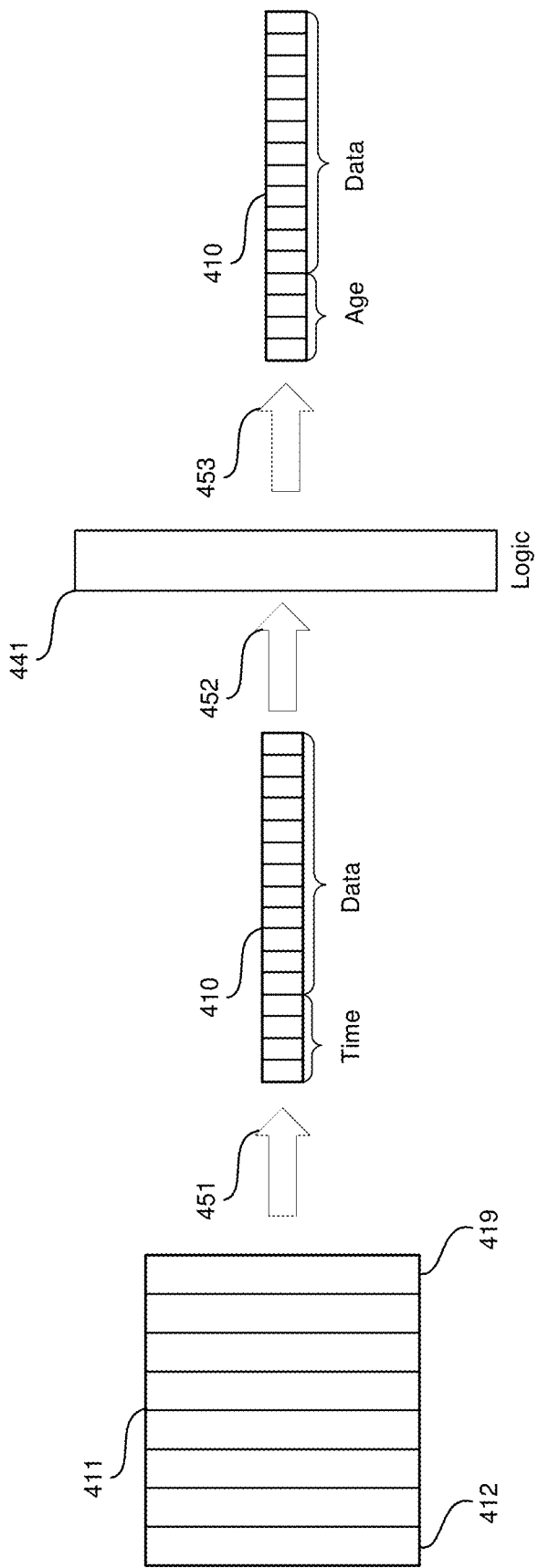
Figure 5:
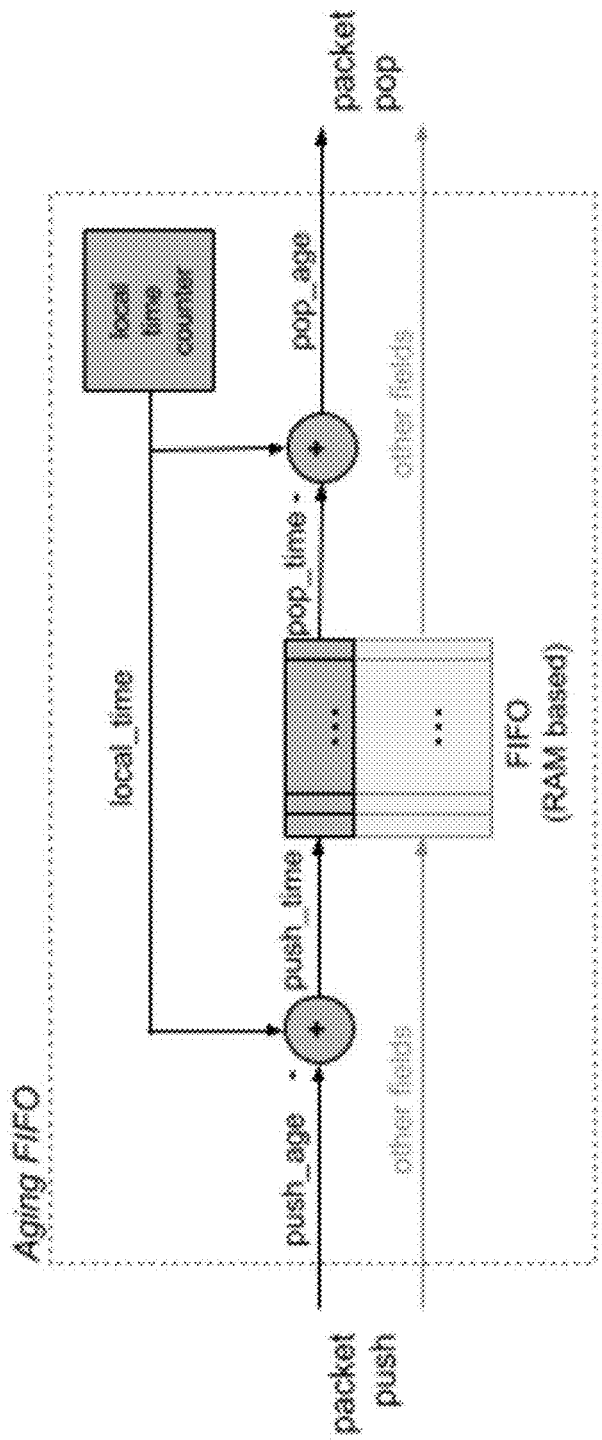
FIG. 5 illustrates logic for updating age data within a data packet, in accordance with aspects of the disclosure.

Although FIGS. 4A, 4B, and 5 illustrate discrete logic converting the age and time data, in some instances, the logic 440 may be implemented by a processor.

FIG. 5 is an illustration of the process of converting age data of a data packet to time data and vice versa for entry into an aging FIFO, such as aging FIFO 411. As illustrated the data packet includes age data representing a "push_age." The push_age is the age of the data packet when it is received by the router and/or aging FIFO. To convert the push_age to a time value, the push_age is subtracted from a "local_time" value provided by a local clock associated with the aging FIFO ("local time counter") by an adder. The resulting value is a "push_time," also referred to as an "injection time." The push_age data of the data packet is replaced with the "push_time" when the data packet is inserted into the aging FIFO.

As further illustrated in FIG. 5, the "push_time" data of the packet is converted to an age value "pop_age" that represents the age of the data packet when it is transmitted from the aging FIFO. To determine the "pop_age", the logic, represented by an adder, subtract the "pop_time" from the current local_time. Pop_time is the same value as the injection time. The age data of the data packet is then updated with the "pop_age," which indicates the current age of the data packet.

For example, data packet may have a "push_age" of 2 when it is injected into the FIFO at time T=10 (indicated by the local clock). When the data packet is injected into the FIFO, the push_age of 2 is replaced with push_time having a value of 8: push_time (i.e., injection time)=10 (local_time)−2(push_age).

Upon ejection at time T=15, the data packet would have a pop_age of 7: pop_age=15(local_time)−8(injection time).

A property of injection times (i.e., push_times) is that they do not change, even as the packets age. Thus, by converting a data packet's age to an injection time and writing the injection time to the FIFO's RAM instead of the age there is no need to continually update the age of the data packet. When the data packet is read from the RAM, the injection time may be converted back to an age using the current value of the local clock. This conversion from age to time and back to age is all done within the aging FIFO, so the local clock does not require any synchronization with the local clocks of other aging FIFOs within the network. Further, this local clock approach avoids any kind of global synchronization that may be required in other implementations.

A drawback of age-time-age conversion is that it may be difficult to bound the age of a data packet when it is transmitted from the FIFO. As such, the bit widths required for push and pop times may be larger than provided by the data packet. To address this, the push time of a data packet may be modified so it is a bounded amount below the largest push time of data packets that arrived before it to the queue (i.e., aging FIFO). This modification is expected to be minimal and similar to the priority inversion encountered within the FIFO. Age-based arbitration prioritizes older data packets or, equivalently, prioritizes data packets with earlier injection times. If a data packet with an earlier push time arrives at the FIFO after a data packet with a later push time, the earlier data packet will be blocked behind the later packet, essentially inheriting its lower priority. This is the priority inversion.

Moreover, if age-based arbitration is working well, data packets may be expected to arrive at each aging FIFO roughly in order of their push time. The net expectation is that enforcing a bounded-decrease push time should not significantly impact the overall performance of the age-based arbitration scheme.

Upon inputting a data packet into an aging FIFO, a sequence of steps, as illustrated below, may be implemented. Initially, the push time of the data packet may be determined. The push time of the data packet may be determined by calculating the aging FIFO's local_time minus the packet's push_age.

If the aging FIFO is empty or the push_time of the data packet is less than the max_push_time associated with the aging FIFO, then max_push_time is replaced with the value of push_time previously determined.

If the push_time of the data packet is less than max_push_time−T, then the value of push_time is updated to be equal to max_push_time−T, where T is a constant that determines the maximum decrease in the sequence of push times and T>=0.

When implementing the steps described herein, the various times (local_time, push_time, and max_push_time) can all be represented using the same number of bits as the packet ages. M may be considered the bit width of these quantities. In some instances, the M-bit representations can wrap around (i.e., go past the maximum value back to a lower value). In general, this problem may be avoided by comparing differences of times and relying on the properties of the aging FIFO to ensure these differences are always in the range [0, 2^M).

In the next step, the push_time may be compared to the max_push_time. Instead of comparing them directly, the comparison may be transformed such that it is between differences known to be in [0, 2^M):
   push_time<max_push_time
   =>local_time−push_age<max_push_time
   =>local_time−max_push_time<push_age The left hand side of the final expression (local_time−max_push_time) is the age of the youngest packet already in the aging FIFO. Because the FIFO avoids age overflow, this expression is known to be in [0, 2^M).

In Step 3, the push_time is compared to the max_push_time−T. This comparison can be transformed to:
   push_time<max_push_time−T
   =>local_time−push_age<max_push_time−T
   =>local_time−max_push_time+T<push_age It follows that the left hand side is in [T, 2^M+T). Given that T<2^M, the final expression can be safely evaluated using M+1 bit arithmetic.

In this formulation, T is a threshold parameter that determines the maximum decrease. To prevent ages from overflowing, the value of the data packet at the head of the FIFO is reviewed and the age of the next entry to be popped (i.e., transmitted) is determined. This age is referred to herein as the pop age.
   pop_age=local_time−pop_time The local time may then be incremented each cycle that the pop_age plus T is less than the maximum age. By doing such, no age of a queued packet can overflow because the bounded decrease ensures that there is no packet in the queue whose age is more than T greater than the age of the head packet. Thus, all times may be represented as M-bit quantities, ignoring wrapping because the pop ages will be within [0, 2^M].

To further extend the range of representable ages, precision may be reduced, as age increases, through age slowing. In age slowing, the aging rate is reduced as data packets approach the maximum age. For instance, the aging rate of a data packet may be reduced by factors of two depending on the current age. If the age is less than half the maximum, the aging rate matches the previous section. If the age is between half and three quarters of the maximum, the aging rate is halved, and so on as illustrated in table 1:

TABLE 1

| Fraction of maximum age | Aging rate |
|---|---|
| [0, ½) | 1 |
| [½, ¾) | ½ |
| [$1 - 2^{-n}$, $1 - 2^{-n-1}$) | $2^{-n}$ |

For an M-bit age field, age slowing increases the effective maximum age to $M2^M$. The aging rate values in Table 1 are merely examples, and other rates may be used.

Figure 6:
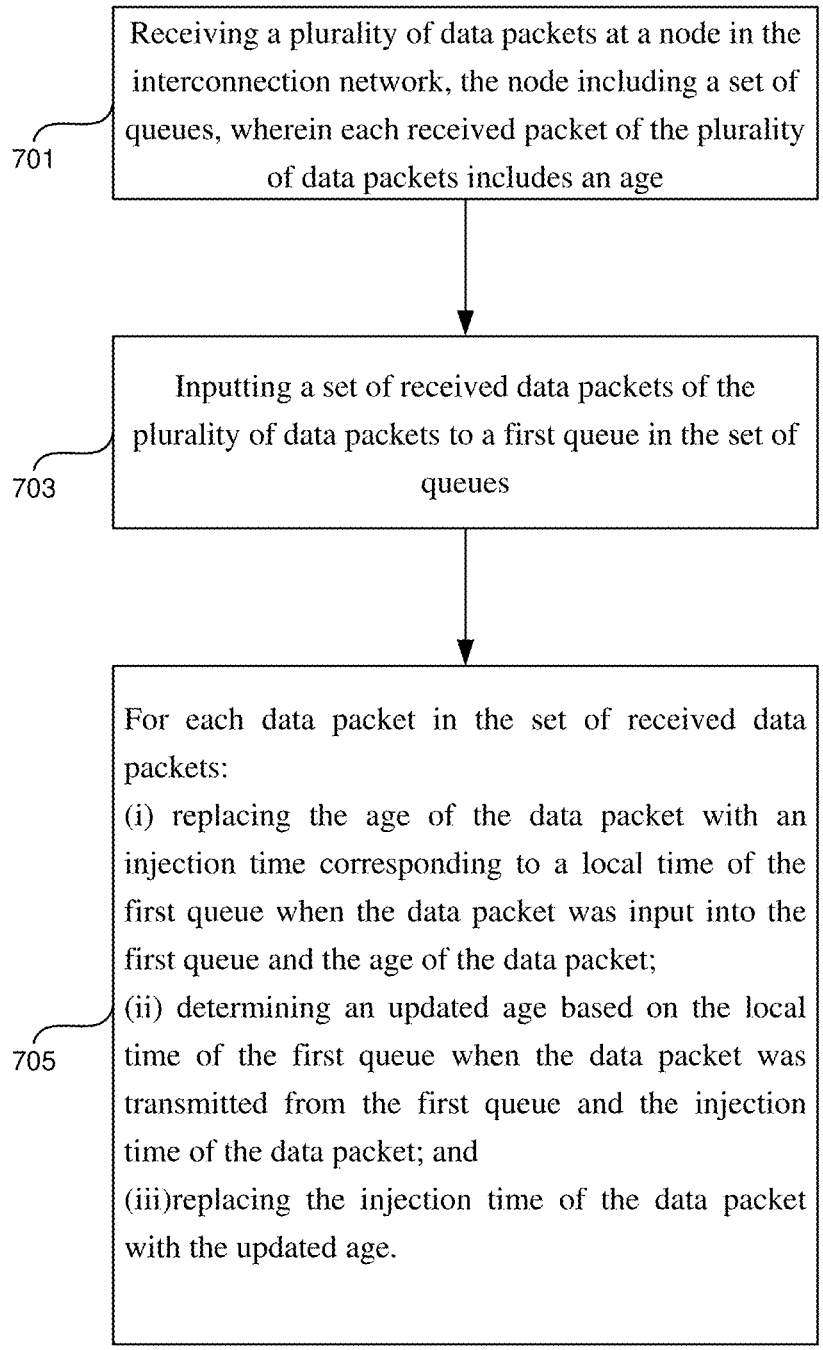
FIG. 6 a flow diagram illustrating a data transmission technique for transmitting data to truly wireless devices according to aspects of the disclosure.

In some instances, the number of bits needed to store the age of a data packet may be determined using the following equation:

age when leaving network=#queue entries/bandwidth    Equation 1:

FIG. 6 illustrates a flow diagram for routing data packets in an interconnection network. As shown in block 701, a plurality of data packets are received at a node in the interconnection network. The node may include a set of queues, wherein each received packet of the plurality of data packets includes an age.

As shown in block 703, a set of received data packets of the plurality of data packets may be inserted into to a first queue in the set of queues.

As shown in block 705, for each data packet in the set of received data packets:
(i) the age of the data packet may be replaced with an injection time corresponding to a local time of the first queue when the data packet was input into the first queue and the age of the data packet;
(ii) an updated age may be determined based on the local time of the first queue when the data packet was transmitted from the first queue and the injection time of the data packet; and
(iii) the injection time of the data packet may be replaced with the updated age.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of routing data packets in an interconnection network, the method comprising:
   receiving a plurality of data packets at a node in the interconnection network, the node including a set of queues, wherein each received packet of the plurality of data packets includes an age;
   inputting a set of received data packets of the plurality of data packets to a first queue in the set of queues; and
   for each data packet in the set of received data packets:
      replacing the age of the data packet with an injection time corresponding to a local time of the first queue when the data packet was input into the first queue and the age of the data packet;
      determining an updated age by subtracting the injection time of the data packet from the local time of the first queue when the data packet was transmitted from the first queue, wherein the updated age is adjusted by an aging rate based on the value of the updated age relative to a maximum age and the updated age is not adjusted by the aging rate when the value of the updated age is less than a threshold amount from the maximum age; and
      replacing the injection time of the data packet with the updated age.

2. The method of claim 1, further comprising bounding the updated age to a maximum age value.

3. The method of claim 1, wherein each data packet transmitted from the first queue is sent to an arbiter.

4. The method of claim 1, wherein an arbiter receives a first data packet transmitted from the first queue and at least one other data packet transmitted from one or more of the other queues of the set of queues.

5. The method of claim 4, wherein the arbiter:
   determines an oldest data packet from the first data packet and the at least one other data packet; and
   transmits the oldest data packet.

6. The method of claim 1, wherein the injection time is calculated by subtracting the age of the data packet from the local time of the first queue when the data packet was input into the first queue.

7. The method of claim 1, wherein the threshold amount is less than half the maximum age.

8. The method of claim 1, wherein the aging rate is:
   (i) 0 when the update age is equal to the maximum age; and
   (ii) 0.5 when the update age is between 50% and 75% of the maximum age; and
   (iii) $2^{-n}$, when the update age divided by the maximum age is between $1-2^{-n}$ and $1-2^{-n-1}$ for any integer n>1.

9. A system of routing data packets in an interconnection network, the system comprising:
   a router including at least one arbiter and a set of queues, where the router is configured to:
      receive a plurality of data packets, wherein each received packet of the plurality of data packets includes an age;
      input a set of received data packets of the plurality of data packets into to a first queue in the set of queues; and
      for each data packet in the set of received data packets:
         replace the age of the data packet with an injection time corresponding to a local time of the first queue when the data packet was input into the first queue and the age of the data packet;
         determine an updated age by subtracting the injection time of the data packet from the local time of the first queue when the data packet was transmitted from the first queue, wherein the updated age is adjusted by an aging rate based on the value of the updated age relative to a maximum age and the updated age is not adjusted by the aging rate when the value of the updated age is less than a threshold amount from the maximum age; and replace the injection time of the data packet with the updated age.

10. The system of claim 9, wherein the router is further configured to bound the updated age to a maximum age value.

11. The system of claim 9, wherein each data packet transmitted from the first queue is sent to the at least one arbiter.

12. The system of claim 9, wherein the at least one arbiter receives a first data packet transmitted from the first queue and at least one other data packet transmitted from one or more of the other queues of the set of queues.

13. The system of claim 12, wherein the at least one arbiter:
   determines an oldest data packet from the first data packet and the at least one other data packet; and
   transmits the oldest data packet.

14. The system of claim 13, wherein the injection time is calculated by subtracting the age of the data packet from the local time of the first queue when the data packet was input into the first queue.

15. The system of claim 9, wherein the threshold amount is less than half the maximum age.

16. The system of claim 9, wherein the aging rate is:
   (i) 0 when the update age is equal to the maximum age; and
   (ii) 0.5 when the update age is between 50% and 75% of the maximum age; and
   (iii) $2^{-n}$, when the update age divided by the maximum age is between $1-2^{-n}$ and $1-2^{-n-1}$ for any integer $n>1$.

* * * * *